July 3, 1945. D. W. JOHNSON 2,379,804
HOLDFAST MEANS FOR SCREW BOLTS
Filed July 2, 1943

Inventor
DAVID W. JOHNSON
by his attorneys
Howson and Howson

Patented July 3, 1945

2,379,804

UNITED STATES PATENT OFFICE 2,379,804

HOLDFAST MEANS FOR SCREW BOLTS

David W. Johnson, New Britain, Conn., assignor to The Arrow-Hart & Hegeman Electric Co., Hartford, Conn., a corporation of Connecticut Application July 2, 1943, Serial No. 493,261

5 Claims. (Cl. 85—32)

This invention relates to means for securely anchoring or locking a screw bolt used to fasten one part to another.

Heretofore, nuts provided with locking inserts, collars, or washers have been used where the requirements were for a nut that would not become loose after continued vibrations and shocks but could be removed, if necessary, without damage to the threads of the bolt or the nut. These nuts were separate elements of the fastening structure and were separately manufactured at considerable cost; and in cases where it was desired to have the nut affixed to one of two members that were to be fastened together, it was necessary to form the nut structurally so as to permit such fastening and an additional operation was necessary to secure the nut to the member.

It is an object of my invention to provide an improved screw bolt fastening that will hold fast against repeated vibrations and shocks.

Another object of my invention in providing a screw-bolt fastening that will hold fast in spite of repeated vibrations and shocks, is to avoid the need for a nut as a separate element and to eliminate the heretofore necessary operation of securing the nut to one of the members to be joined.

Another object is to provide a fastening of the stated type, which may be made with fewer and less expensive operations and parts.

Another object is to provide a fastening of the stated type, utilizing the member to be secured as a part of the fastening means.

Other objects and advantages of the invention will become apparent as it is described in connection with the accompanying drawing.

In the drawing—

Referring to the drawing—

Figure 1:
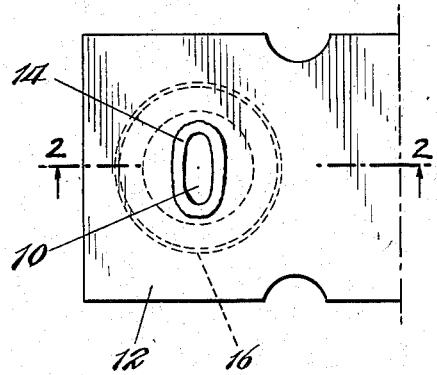
Fig. 1 is a plan view of the first stage of the formation of the holdfast means of this invention as applied to a mounting plate of the device to be mounted, or on which another member is to be mounted.
Figure 3:
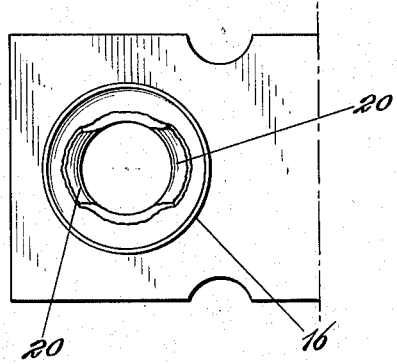
Fig. 3 is a plan view of the third stage of manufacture of the embodiment of the invention started in Fig. 1. In this view, the cup has been secured in place.
Figure 2:
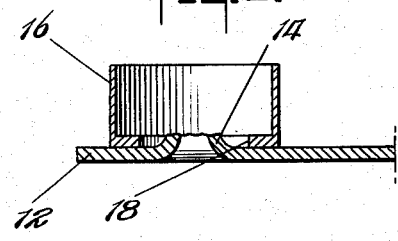
Fig. 2 is a section view, taken along a line such as 2—2 of Fig. 1, of the second stage of manufacture of the embodiment of the invention started in Fig. 1. In this view, a cup, for holding the fiber washer (hereinafter described), has been placed in the position in which it is to be secured in the third stage.
Figure 4:
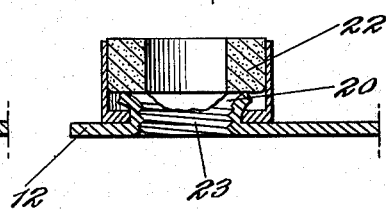
Fig. 4 is a section view similar to Fig. 2 of the fourth stage of manufacture. In this view, the fiber washer has been placed in the structure resulting from the third stage.
Figure 5:
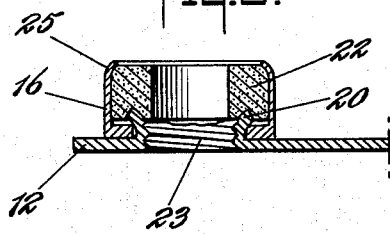
Fig. 5 is a section view similar to Fig. 4, but with the parts in the final assembled position resulting from turning over the edges of the cup on to the fiber washer.
Figure 6:
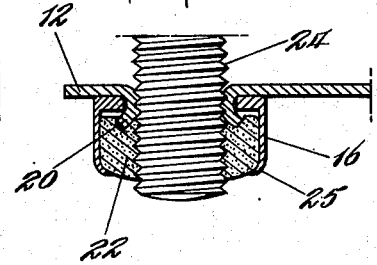
Fig. 6 is a section view similar to Fig. 5 but inverted and with a screw bolt threaded into place.

In the first stage of manufacture, an elliptical perforation 10 is punched in the mounting plate 12 of the device or member which it is desired to mount, or on which it is desired to have another member mounted, by a screw bolt. The mounting plate has a thickness sufficient to have a screw thread tapped into a perforation punched therein. The exact thickness and the pitch of the thread, being relative functions, cannot be exactly limited herein, since both will vary depending on the circumstances of use, such as the permissible thickness, the amount of strain to be encountered, the diameter of the bolt required, and the limitations of screw machines in case of mass production.

Punching the perforation 10 creates a small collar of metal around the perforation. Around the perforation is placed a cylindrical cup 16 with a circular hole in its bottom slightly larger than the major axis of the elliptical perforation 10 and its collar 14.

After the cup 16 is placed in position, a punch is employed to force the stock around the perforation 10 through the hole 18 of the cup and against the walls of the hole in such a way as to extend over the bottom inside wall of the cup around the hole. Due to the elliptical form of the perforation, there is more stock, prior to this last punching operation, between the longer sides of the perforation 10 and the periphery of the hole 18 than between the apexes of the perforation 10 and the periphery of the hole 18. As a result, the punching operation produces diametrically-opposed enlargements or extensions at the portions of the periphery of the hole that were adjacent the longer sides of the elliptical perforation 10. These extensions 20 serve to prevent rotation of a washer or insert 22 made of fiber which is later placed within the cup 16. The washer may be of any other suitable material softer than the metal of which the screw bolt is made and having equivalent elastic properties of fiber.

In size the washer will preferably be slightly less in height than the depth of the cup, and of such diameter as to slidably be fitted into the cup. In internal diameter, the washer will preferably be small enough to have threads cut into it by the securing bolt used.

Prior to inserting the washer, threads 23 are tapped into the hole 18 to receive the securing bolt 24.

With the washer 22 inserted, the edge of the cup 16 is turned over onto the outside of the washer, forming a lip 25, and the washer is pressed down during such operation so that the extensions 20 bite into the face of the washer, thus effectively holding the washer from rotating when the bolt 24 is screwed into threads 23 and continues onward to cut threads into the smooth interior cylindrical wall of the washer.

The locking action of the fiber inserts, being well understood, need not be elaborated. My invention lies in the novel arrangement and combination of parts, and in their simple form and in the ease of fabrication and assembly thereof.

Although an elliptical perforation is preferred, a circular perforation may be employed, in which case the frictional engagement of the extruded edges, extending through the hole in the cup, together with the frictional engagement of the lip 25 of the cup with the washer, is relied on to prevent turning of the washer within the cup. I do not limit the invention to the formation of two extensions like 20. A perforation of other form than elliptical may be chosen to provide one or several extensions similar to 20. In any of such cases, the method I have invented can be followed and its advantages achieved.

Modifications within the scope of my invention will occur to those skilled in the art. Therefore, I do not limit myself to the precise details illustrated and described.

I claim:

1. Holdfast means for screw bolts, comprising a member having a screw-threaded aperture therein, a washer-like member adapted to have a thread cut therein by a screw bolt, a holding member engaging said washer-like member and having a hole, said holding member being secured in place by peripheral metal of said aperture being extruded through said hole and overlying the surface of said holding member.

2. Holdfast means as set forth in claim 1, with the additional provision of an enlargement of said extruded peripheral metal engaging said washer-like member to prevent rotation of said member.

3. Holdfast means for screw bolts, comprising a member having a screw-threaded aperture therein, a fiber washer adapted to have a thread cut therein by a screw bolt, a metallic cup receiving said washer and having a hole in its bottom, said cup being secured in place by peripheral metal around said aperture being extruded through said hole and overlying the surface of the bottom of said cup, a portion of said extruded metal being extended to have biting engagement with said washer to prevent rotation of the washer.

4. Holdfast means for screw bolts, comprising a member having a screw-threaded aperture therein, a washer adapted to have a thread cut therein by a screw bolt, a cup receiving said washer and having a hole in its bottom, said cup being secured in place by peripheral metal around said aperture being extruded through said hole to overlie the adjacent surface of said holding member, a portion of said extruded metal being extended in diametrically opposite direction and having biting engagement with said washer to prevent rotation thereof.

5. Holdfast means for screw bolts, comprising a member having a screw-threaded aperture therein, a washer-like member adapted to have a thread cut therein by a screw bolt, a holding member engaging said washer-like member and having a hole different in shape from said aperture, said holding member being secured in place by peripheral metal of said aperture being extruded through said hole against the walls of said hole and overlying the surface of said holding member.

DAVID W. JOHNSON.